United States Patent
Rengaswamy et al.

(10) Patent No.: US 7,887,627 B2
(45) Date of Patent: *Feb. 15, 2011

(54) DYE-BASED BLACK INK FORMULATIONS AND INK-JET INK SETS

(75) Inventors: Sukanya Rengaswamy, Corvallis, OR (US); Zia Ur Rehman, Corvallis, OR (US); Mary E Austin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

This patent is subject to a terminal disclaimer.

(21) Appl. No.: 11/788,903

(22) Filed: Apr. 23, 2007

(65) Prior Publication Data

US 2008/0257206 A1 Oct. 23, 2008

(51) Int. Cl.
*C09D 11/00* (2006.01)
*C09D 11/02* (2006.01)

(52) U.S. Cl. .................. 106/31.5; 106/31.27; 106/31.52

(58) Field of Classification Search .............. 106/31.27, 106/31.5, 31.52
See application file for complete search history.

(56) References Cited

U.S. PATENT DOCUMENTS

| | | | |
|---|---|---|---|
| 5,017,227 A * | 5/1991 | Koike et al. .............. 106/31.51 |
| 5,439,517 A | 8/1995 | Yoshida et al. | |
| 5,503,666 A | 4/1996 | Mennicke et al. | |
| 5,614,007 A | 3/1997 | Kurabashi et al. | |
| 5,753,016 A | 5/1998 | Hayashi et al. | |
| 6,027,210 A * | 2/2000 | Kurabayashi et al. ....... 347/100 |
| 6,858,069 B2 | 2/2005 | Aoyama et al. | |
| 7,033,423 B2 * | 4/2006 | Rolly ...................... 106/31.27 |
| 7,094,279 B2 | 8/2006 | Hanmura et al. | |
| 7,637,992 B2 * | 12/2009 | Mistry ........................ 106/31.5 |
| 7,638,609 B2 * | 12/2009 | Mistry et al. ................. 534/551 |
| 2006/0144288 A1 | 7/2006 | Ohno et al. | |
| 2007/0062409 A1 | 3/2007 | Mistry et al. | |
| 2008/0107819 A1 * | 5/2008 | Parazak et al. ............. 106/31.5 |
| 2008/0257207 A1 * | 10/2008 | Rengaswamy et al. ... 106/31.43 |
| 2008/0266334 A1 * | 10/2008 | Rehman et al. ................. 347/1 |
| 2009/0041939 A1 * | 2/2009 | Mistry ..................... 106/31.52 |
| 2009/0136720 A1 * | 5/2009 | Matsui et al. ............ 428/195.1 |

FOREIGN PATENT DOCUMENTS

WO 2007032377 A1 3/2007
WO 2007132151 A1 11/2007

OTHER PUBLICATIONS

International Search Report dated Oct. 16, 2008 for International Application No. PCT/US2008/061184.

* cited by examiner

*Primary Examiner*—Helene Klemanski

(57) ABSTRACT

Dye-based black ink formulations, ink-jet ink sets, and methods of making a dye-based black ink formulation, are disclosed.

21 Claims, No Drawings

DYE-BASED BLACK INK FORMULATIONS AND INK-JET INK SETS

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the permanence of inkjet images, particularly on porous media, because this property still falls short of the permanence produced by other printing and photographic techniques. A continued demand in inkjet printing has resulted in the need to produce images of high quality, high permanence, and high durability, while maintaining a reasonable cost. In particular, there is a demand for inkjet printing on porous media that can produce documents and photographs that can kept for long periods of time without fading due to ozone and/or light.

SUMMARY

Briefly described, embodiments of this disclosure include dye-based black ink formulation, ink-jet ink set, and method of making a dye-based black ink formulation, are disclosed. One exemplary dye-based black ink formulation, among others, includes a black dye, wherein the black dye is in an amount from about 0.5 to 5.0 weight percent of the dye-based black ink formulation; a yellow dye, wherein the yellow dye is in an amount from about 0.5 to 4.0 weight percent of the dye-based black ink formulation; a magenta dye, wherein the magenta dye is in an amount from about 0 to 3.5 weight percent of the dye-based black ink formulation; and a cyan dye, wherein the cyan dye is in an amount from about 0 to 4.0 weight percent of the dye-based black ink formulation.

An embodiment of an ink-jet ink set comprises a plurality of colored inks, and a dye-based black ink formulation comprising a black dye, wherein the black dye is in an amount from about 0.5 to 5.0 weight percent of the dye-based black ink formulation; a yellow dye, wherein the yellow dye is in an amount from about 0.1 to 4.0 weight percent of the dye-based black ink formulation; a magenta dye, wherein the magenta dye is in an amount from about 0 to 3.5 weight percent of the dye-based black ink formulation; and a cyan dye, wherein the cyan dye is in an amount from about 0 to 4.0 weight percent of the dye-based black ink formulation.

Another exemplary ink-jet ink set, among others, includes a plurality of colored inks, and dye-based black ink formulation. The dye-based black ink formulation includes a black dye, wherein the black dye is in an amount from about 0.5 to 5.0 weight percent of the dye-based black ink formulation; a yellow dye, wherein the yellow dye is in an amount from about 0.5 to 4.0 weight percent of the dye-based black ink formulation; a magenta dye, wherein the magenta dye is in an amount from about 0.2 to 3.5 weight percent of the dye-based black ink formulation; and a cyan dye, wherein the cyan dye is in an amount from about 0.5 to 4.0 weight percent of the dye-based black ink formulation.

An exemplary method of making a dye-based black ink formulation, among others, includes providing at least one dye from each of the following: a black dye, a yellow dye, a magenta dye, and a cyan dye; mixing the dyes; and forming the dye-based black ink formulation, wherein the black dye is in an amount from about 0.5 to 5.0 weight percent of the dye-based black ink formulation, wherein the yellow dye is in an amount from about 0.5 to 4.0 weight percent of the dye-based black ink formulation, wherein the magenta dye is in an amount from about 0.2 to 3.5 weight percent of the dye-based black ink formulation, and wherein the cyan dye is in an amount from about 0.5 to 4.0 weight percent of the dye-based black ink formulation.

DETAILED DESCRIPTION

Embodiments of the present disclosure will employ, unless otherwise indicated, techniques of synthetic organic chemistry, ink chemistry, media chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Light fastness is defined based on nominal light exposure behind glass before a failure condition (loss in optical density and/or change in hue) is reached. Nominal light exposure is 450 lux per 12 h day. The failure conditions used is 25% dye loss for the black, starting with a black only optical density of 0.6 and 4-ink (CMYK) optical density of 1.5 and or change in hue with time. The light fade is scored on a scale of 1 to 4 where a score of 1 would mean 0-25 yrs of light fade, a score of 2 would mean 26-50 yrs of light fade, a score of 3 would mean 51-75 yrs of light fade, and a score of 4 would mean >75 yrs of light fade.

Ozone fade testing is carried out in a Hampton 903 ozone chamber at a temperature of 25° C., 50% relative humidity and with an ozone concentration of 1 ppm until a failure condition (loss in optical density and/or change in hue) is reached. The failure conditions used is 25% dye loss for the black, starting with a black only optical density of 0.6 and 4-ink (CMYK) optical density of 1.5 and/or change in hue with time. The ozone fade is scored on a scale of 1 to 4 where a score of 1 would mean 0-2 yrs of ozone fade, a score of 2 would mean 3-5 yrs of ozone fade, a score of 3 would mean 6-8 yrs of ozone fade and a score of 4 would mean >9 yrs of ozone fade.

Water resistance is determined using the ISO water resistance testing method ISO/DIS 18935:2004 (E). The waterfastness was scored on a scale of 0-6 where a score of 2 or lower would mean poor water resistance, a score of 3-4 would mean fairly water resistant and a score of 5-6 would indicate good water resistance.

Discussion

Dye-based black ink formulations and ink-jet ink sets including the dye-based black ink formulation are described. The dye-based black ink formulation includes a combination of black dyes, yellow dyes, magenta dyes, and cyan dyes. The dye-based black ink formulation produces black ink that is neutral over a wide media range (e.g., office paper, all-in-one paper, photo paper, semi-gloss paper, HP Office Paper, HP All-In-One Paper, HP Advanced Photo Paper, HP Everyday Photo Paper, semi-gloss, and transparencies), has permanence over long periods of times, and is waterfast. For example, media printed with the dye-based black ink formulation are resistant to ozone fade for at least five years, are resistant to light fade for 50 or more years, and are water resistant, relative to inks made with only black dyes and the like. In particular, media printed with the dye-based black ink formulation have good archival properties when printed on porous media such as, but not limited to, HP Advanced Photo Paper, HP Everyday Photo Paper, semi-gloss.

The dye-based black ink formulation can be printed using an ink dispensing system that includes, but is not limited to, ink-jet technologies and coating technologies, which dispense the ink onto the print medium. Ink-jet technology, such as drop-on-demand and continuous flow ink-jet technologies, can be used to dispense the ink. The ink dispensing system can include at least one ink-jet printhead system (e.g., thermal ink-jet printhead and/or a piezo ink-jet print head) operative to dispense (e.g., jet) the inks through one or more of a plurality of nozzles in a printhead. The printhead system incorporates an array of firing chambers that receive the ink dissolved or dispersed in a liquid vehicle, which are in fluid communication with one or more ink reservoirs.

In an embodiment, the dye-based black ink formulation can be included in a 4-ink ink-jet set including a cyan ink, magenta ink, and yellow ink, where the dye-based black ink formulation is the fourth ink of the set or as the fifth ink in a five-ink ink-jet set which, in addition to the colors has a pigment based black ink. In another embodiment, the dye-based black ink formulation can be included in a 6-ink ink-jet set including cyan ink, magenta ink, yellow ink, light cyan ink, light magenta ink, where the dye-based black ink formulation is the sixth ink of the set or as the seventh ink in a seven ink system where in addition to the colors there is a pigmented black ink. In another embodiment, the dye-based black ink formulation can be included in a 8-ink ink-jet set including cyan ink, magenta ink, yellow ink, light cyan ink, light magenta ink, light gray ink, medium gray ink, where the dye-based black ink formulation is the eighth ink of the set or as the ninth ink in a nine-ink ink-jet set which, in addition to the cyan ink, magenta ink, yellow ink, light cyan ink, light magenta ink, light gray ink, and medium gray ink, has a pigmented black ink.

The term "print media" or "print medium" can include, but is not limited to, a paper substrate, a photobase substrate, a plastic media (e.g., clear to opaque plastic film) substrate, and the like. The print media may include, but is not limited to, a hard or flexible material made from a polymer, a paper, a glass, a ceramic, a woven cloth, or a non-woven cloth material.

The dye-based black ink formulation includes, but is not limited to, a black dye, a yellow dye, a magenta dye, and a cyan dye. In addition, the dye-based black ink formulation includes, but is not limited to, solvents, salts, buffers, biocides, binders, an aqueous solution, and combinations thereof.

The black dye can include, but is not limited to, 1H-Pyrazole-3-carboxylic acid, 4-[[6-[[4-[(1,5-disulfo-2-naphthalenyl) azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt (Experimental Black 16), 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy) phenyl]azo]-4,5-dihydroxy-, potassium sodium salt (Experimental Black 10), Cuprate(4-), [2-(amino-κN)ethanol][7-[[3-(hydroxy-κO)-4-[[1-(hydroxy-κO)-3-sulfo-7-[(2-sulfoethyl)amino]-2-naphthalenyl]azo-κN1]phenyl]azo]-1,3-naphthalenedisulfonato(6-)]-, tetrasodium (9Cl) (Experimental Black 11), 2,7-Naphthalenedisulfonic acid, 6-amino-4-hydroxy-3-[[7-sulfo-4-[(4-sulfophenyl)azo]-1-naphthalenyl]azo]-, tetrasodium salt (7Cl) (Food Black 2),1,3-Benzenedicarboxylic acid, 5-[[4-[(7-amino-1-hydroxy-3-sulfo-2-naphthalenyl)azo]-6-sulfo-1-naphthalenyl]azo]-, tetraammonium salt (9Cl) (Project 286), and combinations thereof.

In addition, it should be noted that the black dye can include, but is not limited to, trisazo-dyes or tetra azo dyes. In particular, the black dye can include compounds defined by formula 1 and 2 below:

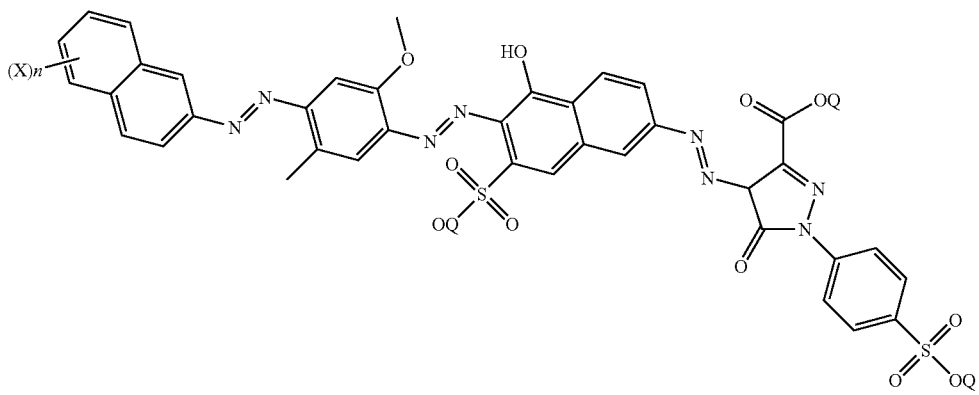

Formula (1)

wherein X is SO₃Q, where Q is a sodium ion, lithium ion, or a combination thereof, and where n is 1, 2 or 3.

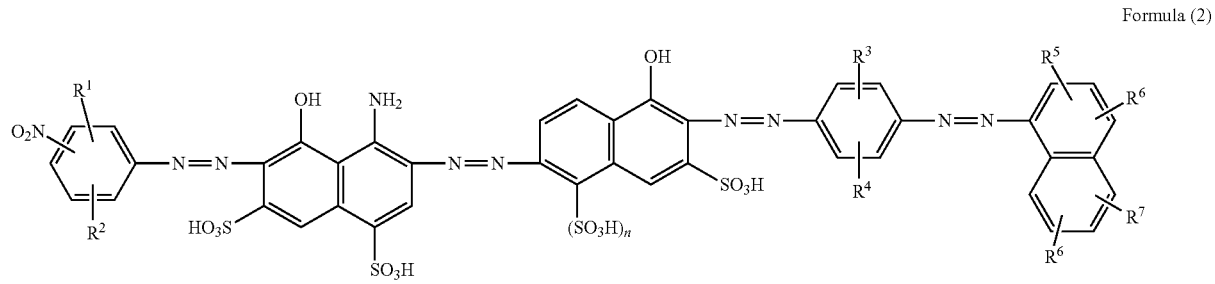

Formula (2)

wherein $R^1$ and $R^2$ each independently represents a hydrogen, a halogen, a cyano group, a carboxy group, a sulfo group, a sulfamoyl group, a N-alkylaminosulfonyl group, and a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, a N-phenylaminosulfonyl group; and n is 0 or 1.

The black dye can be about 0.5 to 5.0 weight % of the dye-based black ink formulation.

The yellow dye can include, but is not limited to, 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl) (Y104), 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9Cl) (Y1189), Benzenesulfonic acid, 2,5-dichloro-4-[4,5-dihydro-3-methyl-5-oxo-4-[(4-sulfophenyl)azo]-1H-pyrazol-1-yl]-, disodium salt (9Cl) (Acid Yellow 17-Na), 1 H-Pyrazole-3-carboxylic acid, 4,5-dihydro-5-oxo-1-(4-sulfophenyl)-4-[(4-sulfophenyl)azo], trisodium salt (9Cl) (Acid Yellow 23), 1,5-Naphthalenedisulfonic acid, 3,3'-[[6-[(2-hydroxyethyl)amino]-1,3,5-triazine-2,4-diyl]bis[imino(2-methyl-4,1-phenylene)-2,1-diazenediyl]]bis-, sodium salt (1:4) or TMA salt (Direct Yellow 86), and combinations thereof. The yellow dye can be about 0.1 to 4.0 weight % of the dye-based black ink formulation.

The magenta dye can include, but is not limited to, 6-Benzothiazolesulfonic acid, 2-[4-cyano-3-(1,1-dimethylethyl)-5-[[4-methyl-6-[(6-sulfo-2 benzothiazolyl)(2,4,6-trimethyl-3-sulfophenyl)amino]-2-[(2,4,6-trimethyl-3-sulfophenyl)amino]-3-pyridinyl]azo]-1 H-pyrazol-1-yl] (Experimental Magenta 1), 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3) (Experimental Magenta 2), 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9Cl) (Reactive Red 180-Na), Xanthylium, 3-[(2,6-dimethylphenyl)amino]-6-[(2,6-dimethylsulfophenyl)amino]-9-(2-sulfophenyl)-, inner salt, monosodium salt (9Cl) (Acid Red 289-Na), Xanthylium, 3,6-bis(diethylamino)-9-(2,4-disulfophenyl)-, inner salt, sodium salt (9Cl) (Acid Red 52), 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (9Cl) (M-377-Na), Nickel, 5-[(2-hydroxy-3,7-disulfo-1-naphthalenyl)azo]-1H-1,2,4-triazole-3-carboxylate sodium complexes (Experimental Magenta 7),), and combinations thereof. The magenta dye can be about 0 to 3.5 weight % of the dye-based black ink formulation.

The cyan dye can include, but is not limited to, Cuprate(3-), [[3,3',3"-[[23-[[3-[[(2-hydroxypropyl)amino]sulfonyl]propyl]sulfonyl]-29H,31H-phthalocyanine-2,9,16-triyl-κN29, κN30, κN31, κN32]tris(sulfonyl)]tris[1-propanesulfonato]] (5-)]-, trilithium, (SP-4-2)-(9Cl) (Experimental Cyan 1), Copper, [29H,31H-phthalocyaninato (2-)-kN29, kN30, kN31,kN32]-, aminosulfonyl[(2-hydroxyethyl)amino]sulfonyl sulfo derivs., ammonium sodium salts (Experimental Cyan 17i), Copper, [29H,31H-phthalocyaninato(2-)-xN29, xN30,xN31,xN32]-, aminosulfonyl[(2-hydroxyethyl)amino] sulfonyl sulfo derivs, sodium salts (Cyan 485).

The cyan dye can be about 0 to 4.0 weight % of the dye-based black ink formulation.

When the dye-based black ink formulation is printed on media, in particular porous media, the dye-based black ink formulation has black ink neutrality, permanence, and waterfastness. Specific examples of characteristics of embodiments of the present disclosure are provided in the Examples.

As mentioned above, the dye-based black ink formulation can include solvents, salts, buffers, biocides, binders, an aqueous solution, and combinations thereof, which are described in more detail below.

The solvent can include, but is not limited to, water soluble organic solvents. The water soluble organic solvents can include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides.

In particular, the solvent can include, but is not limited to, ethoxylated glycerol, 2-methyl-1,3-propanediol; 2-methyl-2,4-pentanediol; 1,5-pentanediol; 2-pyrrolidone; 1-(2-hydroxylethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5-diol; trimethylol propane, 3-hexyne-2,5-diol; sulfolane; 3-pyridyl carbinol; and other pyrridine derivatives. In addition, the solvents can be added to reduce the rate of evaporation of water in the ink-jet to minimize clogging or other properties of the ink such as viscosity, pH, surface tension, optical density, and print quality.

The solvent can be about 5 to 25 weight % of the dye-based black ink formulation.

The salt can include, but is not limited to, ammonium, potassium, or lithium benzoate salts; ammonium, potassium, or lithium acetates; lithium, potassium, or lithium xylene sulfonate salts; nitrates of $NH_4$, sodium, lithium, and potassium; lactates of ammonium, potassium, or lithium; citrates of ammonium, potassium, or lithium; carbonates of sodium, lithium, and potassium; diphosphates of sodium, lithium, and potassium; triphosphates of sodium, lithium, and potassium; and mixtures thereof. In addition, the salt can include sodium, lithium, and potassium salts of compounds such as, but not limited to, citrate, succinate, lactate, formate, gluconate, tartarate, malonate, fumarate, malate, sebacate, laurate, glutarate, acetate, oxylate, adipicate, pimelicate, subericate, azelaicate, and mixtures thereof.

The salt can be about 1 to 6 weight % of the dye-based black ink formulation.

Various buffers or pH adjusting agents can also be optionally used in the ink formulation. The buffering agent can include, but are not limited to, hydroxides of alkali metals and amines (e.g., lithium hydroxide, sodium hydroxide, potassium hydroxide, and citric acid); amines (e.g., triethanolamine, diethanolamine, and dimethylethanolamine); hydrochloric acid; and other basic or acidic components which do not substantially interfere with the bleed control or optical density characteristics. In addition, commercially available pH buffers can also be used and are available from Sigma Aldrich (e.g., MES, MOPs, Trizma, Bis-Tris, MOPSO, TES, TAPSO, TEA, TRICINE, BICINE, TAPS, and AMPSO, in the acid or salt form).

The buffers can be about 0.1 to 3 weight % of the dye-based black ink formulation.

Various biocides can be used to inhibit growth of undesirable microorganisms. The biocides can include, but are not limited to, benzoate salts, sorbate salts, commercial products such as NUOSEPT™ (Nudex, Inc., a division of Huls America), UCARCIDE™ (Union Carbide), VANCIDE (RT Vanderbilt Co.), and PROXEL™ (ICI Americas), and other biocides.

The biocides can be about 0.1 to 3 weight % of the dye-based black ink formulation.

Various surfactants can be used in the ink formulation. The surfactant can include, but are not limited to, anionic, non-ionic, and zwitterionic surfactants. The anionic surfactant can include, but is not limited to, sodium or potassium salts of straight chain fatty acids; sodium and potassium salts of coconut oil fatty acids; sodium and potassium salts of tall oil fatty acids; amine salts; acylated polypeptides; linear alkyl benzene sulfonates; higher alkyl benzene sulfonates; benzene; toluene; xylene; cumenesulfonate; lignosulfonates; petroleum sulfonates; N-acyl-n-alkyltaurates; paraffin sulfonates; secondary n-alkanesulfonates; alpha olefin sufonates; sulfosuccnic esters; alkyl naphalene sulfonates; isethionates; sulfuric acid ester salts; sulfated polyoxyethylenated straight-chain alcohols; sulfated triglycerides oils; phosphoric and polyphosphoric acid esters; and perfluorinated anionic surfactants.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary acetylenic glycols, polyoxyethylenated silicones, N-alkylprrrolidones, and alkylpolyglycosides.

The zwitterionic surfactant can include, but is not limited to, beta-N-alkylaminopropionic acids, N-alkyl-beta-iminodipropionic acids, imidazoline carboxylates, N-alkylbetaines, amine oxides, sulfobetaines and sultaines surfactants.

The surfactant can be about 0.05 to 3.0 weight % of the dye-based black ink formulation.

As mentioned above, the dye-based black ink formulation can be used in conjunction with one or more color inks in an ink-jet ink set (e.g., 4-ink printing system, 6-ink printing system, and 8-ink printing system). The ink formulation and the one or more color inks can be used in the same printhead or in one or more printheads.

Specific examples of such dyes include the Pro-Jet series of dyes available from Avecia Ltd., including Pro-Jet Yellow I Direct Yellow 86, Acid Red 249, Direct Blue 199, Direct Black 168, and Direct Yellow 132; Aminyl Brilliant Red F-B (Sumitomo Chemical Co.); the Duasyn line of "salt-free" dyes available from Hoechst, such as Reactive Black 31, Direct Yellow 157, Reactive Yellow 37, Acid Yellow 23, Reactive Red 180, Acid Red 52, and Acid Blue 9; mixtures thereof; and the like.

Further examples include Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Carolina Color and Chemical), Direct Blue 86, (Mobay Chemical), Reactive Red 4, Aldrich Chemical), Reactive Red 56, Pylam, Inc., Levafix Brilliant Red E-4B (Mobay Chemical), Levafix Brilliant Red E-6BA (Mobay Chemical), Pylam Certified D&C Red #28 (Pylam), Direct Brill Pink B Ground Crude (Crompton & Knowles), Cartasol Yellow GTF Presscake (Sandoz, Inc.), Tartrazine Extra Conc. (Sandoz, Inc.), Carolina Color and Chemical, Cartasol Yellow GTF Liquid Special 110 (Sandoz, Inc.), D&C Yellow #10 (Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B, Procion Red MX 8B GNS, Procion Red G, Procion Yellow MX-8G, Procion Black H-EXL, Procion Black P-N, Procion Blue MX-R, Procion Blue MX4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. This list is intended to be merely exemplary, and should not be considered limiting.

EXAMPLES

Now having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Table 1 provides the performance of different black dyes when used individually at a 4.0 weight % in an ink. The black inks do not provide a neutral black color on printing, do not provide equal to or greater than 5 years of ozone resistance, and do not provide equal to or greater than 50 years of light resistance while displaying good water resistance properties.

TABLE 1

Black dye comparison-4% dye load on porous media. Light fade and ozone fade based on a arbitrary scale of 1-4 and water fastness on a scale of 1-5

|  | Ex Black 10 | Formula 2 | Ex Black 16 |
|---|---|---|---|
| Color | Blue | Blue | Reddish blue |
| Light Fade | 2 | 4 | 4 |
| Ozone | 1 | 3 | 2 |
| Water Fastness | 5 | 1 | 3 |
| L*min | 5.8 | 14.7 | 6.98 |
| Chrom | 11.6 | 24.6 | 8.1 |

Example 2

Table 2 provides examples of blending dyes. The dyes listed in Table 2 can be mixed with black dyes and one another to increase light fade, ozone fade, and water fastness. The color dyes chosen for blending are selected to compensate for the performance gaps in the black dye

TABLE 2

| Performance Attribute | Y1189 | Ex Magenta 1 | Ex. Magenta 2 | Ex. Cyan 1 |
|---|---|---|---|---|
| Light Fade | 3 | 4 | 3 | 4 |
| Ozone Fade | 3 | 4 | 4 | 3 |
| Water Fastness | 5 | 4 | 4 | 5 |

Example 3

Table 3 provides performance of black inks made by blending a suitable black dye such as Experimental Black 16 with one or more or more color dyes (C,M,Y) to enhance color neutrality, light fade, ozone fade, and waterfastness.

TABLE 3

|  | Black Ink |
|---|---|
| Color | Neutral black (low chroma and L*min) |
| Light Fade | 3 or greater |
| Ozone Fade | 4 |
| Water Fastness | 5 or greater |
| L*min | <8 |
| Chroma | <8 |

Example 4

Table 4a provides an illustrative embodiment of an ink formulation of the present disclosure. The use of the black dye Experimental Black 10 in a blend with Y104 and Experimental Magenta 1 provides good color neutrality and waterfastness properties and acceptable light fade (Table 4b). Images printed with this ink however, are not resistant to ozone for 5 or more years thus demonstrating the importance of the black dye performance in blended black inks.

TABLE 4a

| Component | CAS# or Lot# | Ink 1 |
|---|---|---|
| EHPD | 77-99-6 | 9 |
| 2-Pyrrolidinone | 616-45-5 | 6.5 |
| 1,5 Pentanediol | 111-29-5 | 2 |
| Tergitol 15-S-7 | 68131-40-8 | 0.2 |
| MES acid | 4432-31-9 | 0.2 |
| DOWFAX 8390 |  | 0.04 |
| EDTA Na2 | 6381-92-6 | 0.1 |
| Proxel GXL |  | 0.1 |
| Dyes | Weight % | |
| Y104 | 1.5-2.5 | |
| Ex. Black 10 | 2.0-30 | |
| Ex. Magenta 1 | 0.5-1.5 | |

TABLE 4b

|  | Properties of Ink 1 |
|---|---|
| Color | Neutral black |
| Light Fade | 2 |
| Ozone Fade | 2 |
| Water Fastness | 5 |
| L*min | <8 |
| Chroma | <8 |

Example 5

Table 5a provides an illustrative embodiment of an ink formulation of the present disclosure. The use of the black dye Experimental Black 16 in a blend with Y104 and Experimental Magenta 1 provides good color neutrality and waterfastness properties as well as good light fade and ozone fade properties (Table 5b), thus demonstrating the importance of the black dye performance in blended black inks.

TABLE 5a

| Component | CAS# or Lot# | Ink 2 |
|---|---|---|
| EHPD | 77-99-6 | 9 |
| 2-Pyrrolidinone | 616-45-5 | 6.5 |
| 1,5 Pentanediol | 111-29-5 | 2 |
| Tergitol 15-S-7 | 68131-40-8 | 0.2 |
| MES acid | 4432-31-9 | 0.2 |
| DOWFAX 8390 | | 0.04 |
| EDTA Na2 | 6381-92-6 | 0.1 |
| Proxel GXL | | 0.1 |

| Dyes | Weight % |
|---|---|
| Ex. Magenta 1 | 0.3-0.9 |
| Y104 | 1.0-2.5 |
| Ex. Cyan 1 | 0.5-2.5 |
| Ex. Black 16 | 1.0-3.0 |

TABLE 5b

| Properties of Ink 2 | |
|---|---|
| Color | Neutral black |
| Light Fade | 4 |
| Ozone Fade | 4 |
| Water Fastness | 5 |
| L*min | <8 |
| Chroma | <8 |

Example 6

Table 6a provides an illustrative embodiment of an ink formulation of the present disclosure. In this example Experimental Black 16 is blended with a yellow dye to provide an ink with a neutral black color, good waterfastness, light fade and ozone fade properties (Table 6b).

TABLE 6a

| Component | CAS# or Lot# | Ink 3 |
|---|---|---|
| EHPD | 77-99-6 | 9 |
| 2-Pyrrolidinone | 616-45-5 | 6.5 |
| 1,5 Pentanediol | 111-29-5 | 2 |
| Tergitol 15-S-7 | 68131-40-8 | 0.2 |
| MES acid | 4432-31-9 | 0.2 |
| DOWFAX 8390 | | 0.04 |
| EDTA Na2 | 6381-92-6 | 0.1 |
| Proxel GXL | | 0.1 |

| Dyes | Weight % |
|---|---|
| Y104 | 0.1-1 |
| Ex. Black 16 | 3.0-4.0 |

TABLE 6b

| Properties of Ink 3 | |
|---|---|
| Color | Neutral black |
| Light Fade | 4 |
| Ozone Fade | 4 |
| Water Fastness | 5 |
| L*min | <8 |
| Chroma | <8 |

Example 7

Table 7a provides an illustrative embodiment of an ink formulation of the present disclosure. In this example the black dye based on formula 2 is blended with a yellow dye Y104 and Experimental Magenta 1. This blend results in an ink that do not provide as neutral black inks as in examples 5 and 6 but they have excellent light fade (Table 7b). The images printed with this ink have better ozone fade than the ink in Example 4 however, it does not meet or exceed the performance of the inks in Examples 5 and 6.

TABLE 7a

| Component | CAS# or Lot# | Ink 4 31-10 |
|---|---|---|
| EHPD | 77-99-6 | 10.9 |
| 2-Pyrrolidinone | 616-45-5 | 6.5 |
| 1,5 Pentanediol | 111-29-5 | 2 |
| Tergitol 15-S-7 | 68131-40-8 | 0.2 |
| MES sodium | 71119-23-8 | 0.2 |
| DOWFAX 8390 | | 0.04 |
| EDTA Na2 | 6381-92-6 | 0.1 |
| Proxel GXL | | 0.1 |

| Dyes | Weight % |
|---|---|
| Formula 2 (10% solids) | 1.5-2.5 |
| Ex. Magenta 1 (12% solids) | 1.0-2.0 |
| Y104 (20% solids) | 2.0-3.0 |

TABLE 7b

| Properties of Ink 4 | |
|---|---|
| Color | Blue Black |
| Light Fade | 4 |
| Ozone Fade | 3 |
| Water Fastness | 4 |
| L*min | >8 |
| Chroma | >8 |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:
1. A dye-based black ink formulation, comprising:
   a black dye, wherein the black dye is in an amount from about 0.5 to 5.0 weight percent of the dye-based black ink formulation;
   a yellow dye, wherein the yellow dye is in an amount from about 0.1 to 4.0 weight percent of the dye-based black ink formulation;
   a magenta dye, wherein the magenta dye is in an amount from about 0 to 3.5 weight percent of the dye-based black ink formulation; and
   a cyan dye, wherein the cyan dye is in an amount from about 0 to 4.0 weight percent of the dye-based black ink formulation wherein the black dye is selected from the group consisting of 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt; 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy)phenyl]azo]-4,5-dihydroxy-, potassium sodium salt; Cuprate(4-), [2-(amino-κN)ethanol][7-[[3-(hydroxy-κO)-4-[[1-(hydroxy-κO)-3-sulfo-7-[(2-sulfoethyl)amino]-2-naphthalenyl]azo-κN1]phenyl]azo]-1,3-naphthalenedisulfonato(6-)]-, tetrasodium (9CI); 2,7-Naphthalenedisulfonic acid, 6-amino-4-hydroxy-3-[[7-sulfo-4-[(4-sulfophenyl)azo]-1-naphthalenyl]azo]-, tetrasodium salt (7CI); 1,3-Benzenedicarboxylic acid, 5-[[4-[(7-amino-1-hydroxy-3-sulfo-2-naphthalenyl)azo]-6-sulfo-1-naphthalenyl]azo]-, tetraammonium salt (9CI); and combinations thereof; and compounds defined by formula 1 or formula 2:

Formula (1)

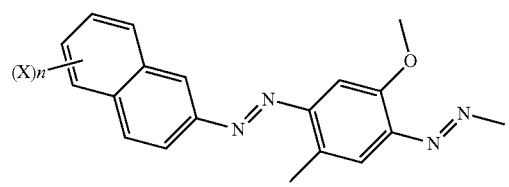

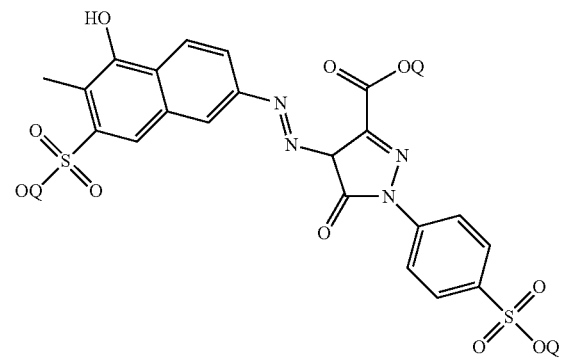

wherein X is SO₃Q, where Q is a sodium ion, lithium ion, or a combination thereof, and where n is 1, 2 or 3; and Formula (2)

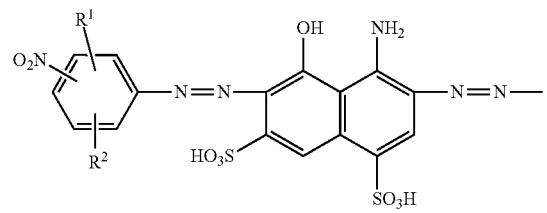

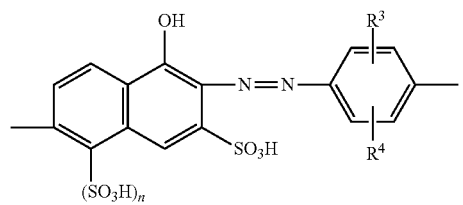

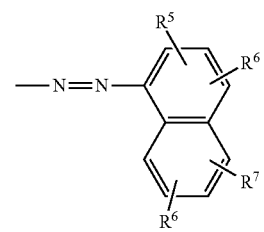

wherein $R^1$ and $R^2$ each independently represents a hydrogen, a halogen, a cyano group, a carboxy group, a sulfo group, a sulfamoyl group, a N-alkylaminosulfonyl group, or a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, or a N-phenylaminosulfonyl group; and n is 0 or 1.

2. The dye-based black ink formulation of claim 1, wherein the black dye is a compound defined by formula 1 below:

Formula (1)

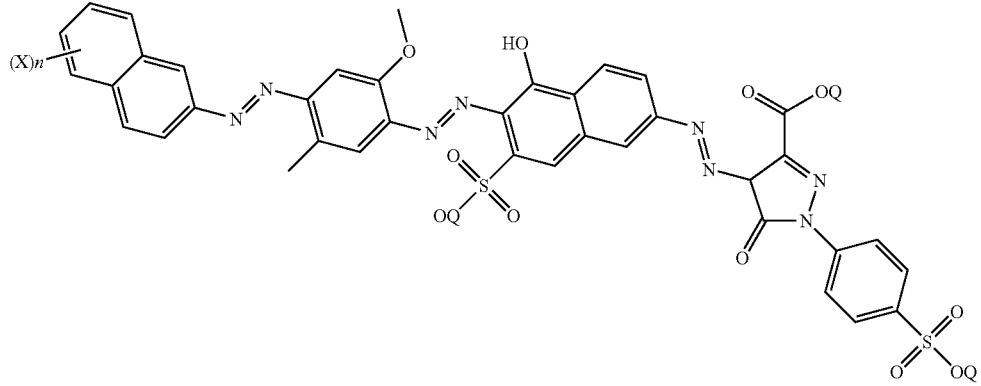

wherein X is SO₃Q, where Q is a sodium ion, lithium ion, or a combination thereof, and where n is 1, 2 or 3.

3. The dye-based black ink formulation of claim 1, wherein the black dye is a compound defined by formula 2 below:

Formula (2)

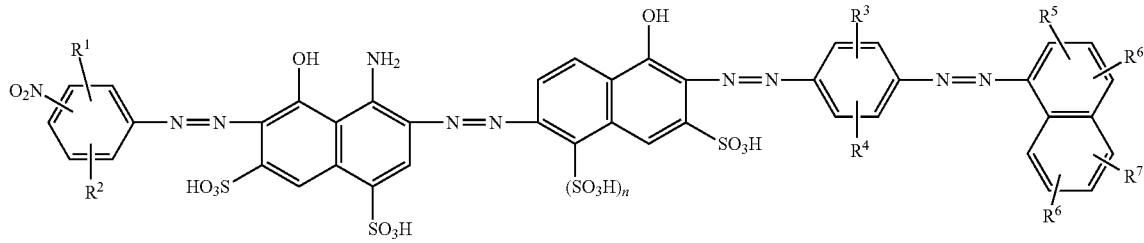

wherein $R^1$ and $R^2$ each independently represents a hydrogen, a halogen, a cyano group, a carboxy group, a sulfo group, a sulfamoyl group, a N-alkylaminosulfonyl group, or a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, or a N-phenylaminosulfonyl group; and n is 0 or 1.

4. The dye-based black ink formulation of claim 1, wherein the yellow dye is selected from the group consisting of 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9CI); 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9CI); Benzenesulfonic acid, 2,5-dichloro-4-[4,5-dihydro-3-methyl-5-oxo-4-[(4-sulfophenyl)azo]-1H-pyrazol-1-yl]-, disodium salt (9CI); 1H-Pyrazole-3-carboxylic acid, 4,5-dihydro-5-oxo-1-(4-sulfophenyl)-4-[(4-sulfophenyl)azo], trisodium salt (9CI); 1,5-Naphthalenedisulfonic acid, 3,3'-[[6-[(2-hydroxyethyl)amino]-1,3,5-triazine-2,4-diyl]bis[imino(2-methyl-4,1-phenylene)-2,1-diazenediyl]]bis-, sodium salt (1:4) or TMA salt; and combinations thereof.

5. The dye-based black ink formulation of claim 1, wherein the magenta dye is selected from the group consisting of 6-Benzothiazolesulfonic acid, 2-[4-cyano-3-(1,1-dimethylethyl)-5-[[4-methyl-6-[(6-sulfo-2benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl]; 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3); 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9CI); Xanthylium, 3-[(2,6-dimethylphenyl)amino]-6-[(2,6-dimethylsulfophenyl)amino]-9-(2-sulfophenyl)-, inner salt, monosodium salt (9CI); Xanthylium, 3,6-bis(diethylamino)-9-(2,4-disulfophenyl)-, inner salt, sodium salt (9CI); 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (9CI); Nickel, 5-[(2-hydroxy-3,7-disulfo-1-naphthalenyl)azo]-1H-1,2,4-triazole-3-carboxylate sodium complexes; and combinations thereof.

6. The dye-based black ink formulation of claim 1, wherein the cyan dye is Cuprate(3-), [[3,3',3''-[[23-[[3-[[(2-hydroxypropyl)amino]sulfonyl]propyl]sulfonyl]-29H,31H-phthalocyanine-2,9,16-triyl-κN29,κN30,κN31,κN32]tris(sulfonyl)]tris[1-propanesulfonato]](5-)]-, trilithium, (SP-4-2)-(9CI).

7. An ink-jet ink set, comprising:
a plurality of colored inks, and
dye-based black ink formulation, comprising:
- a black dye, wherein the black dye is in an amount form about 0.5 to 5.0 weight percent of the dye-based black ink formulation;
- a yellow dye, wherein the yellow dye is in an amount from about 0.1 to 4.0 weight percent of the dye-based black ink formulation;
- a magenta dye, wherein the magenta dye is in an amount from about 0 to 3.5 weight percent of the dye-based black ink formulation; and
- a cyan dye, wherein the cyan dye is in an amount from about 0 to 4.0 weight percent of the dye-based black ink formulation, wherein the black dye is selected from the group consisting of 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt; 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy)phenyl]azo]-4,5-dihydroxy-, potassium sodium salt; Cuprate(4-), [2-(amino-κN)ethanol][7-[[3-(hydroxy-κO)-4-[[1-(hydroxy-κO)-3-sulfo-7-[(2-sulfoethyl)amino]-2-naphthalenyl]azo-κN1]phenyl]azo]-1,3-naphthalenedisulfonato(6-)]-, tetrasodium (9Cl); 2,7-Naphthalenedisulfonic acid, 6-amino-4-hydroxy-3-[[7-sulfo-4-[(4-sulfophenyl)azo]-1-naphthalenyl]azo]-, tetrasodium salt (7Cl); 1,3-Benzenedicarboxylic acid, 5-[[4-[(7-amino-1-hydroxy-3-sulfo-2-naphthalenyl)azo]-6-sulfo-1-naphthalenyl]azo]-, tetraammonium salt (9Cl); and combinations thereof; and compounds defined by formula 1 or formula 2:

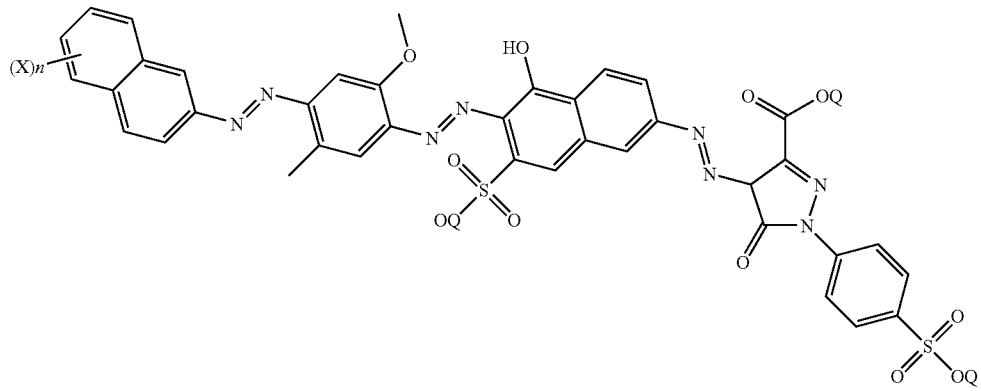

Formula (1)

wherein X is $SO_3Q$, where Q is a sodium ion, lithium ion, or a combination thereof, and where n is 1, 2 or 3,

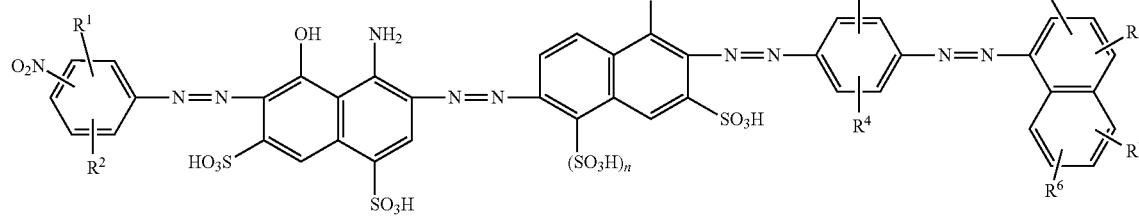

Formula (2)

wherein R¹ and R² each independently represents a hydrogen, a halogen, a cyano group, a carboxy group, a sulfo group, a sulfamoyl group, a N-alkylaminosulfonyl group, or a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, or a N-phenylaminosulfonyl group; and n is 0 or 1.

8. The ink-jet ink set of claim 7, wherein the black dye is a compound defined by formula 1 below:

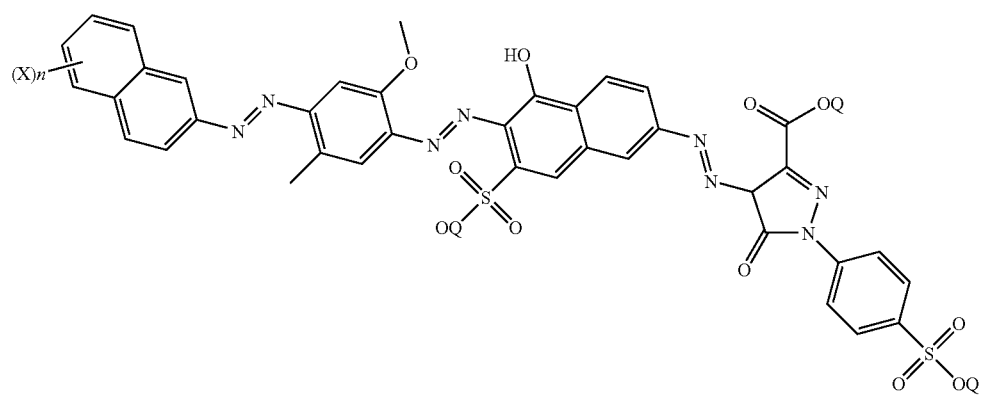

Formula (1)

wherein X is $SO_3Q$, where Q is a sodium ion, lithium ion, or a combination thereof, and where n is 1, 2 or 3.

9. The ink-jet ink set of claim 7, wherein the black dye is a compound defined by formula 2 below:

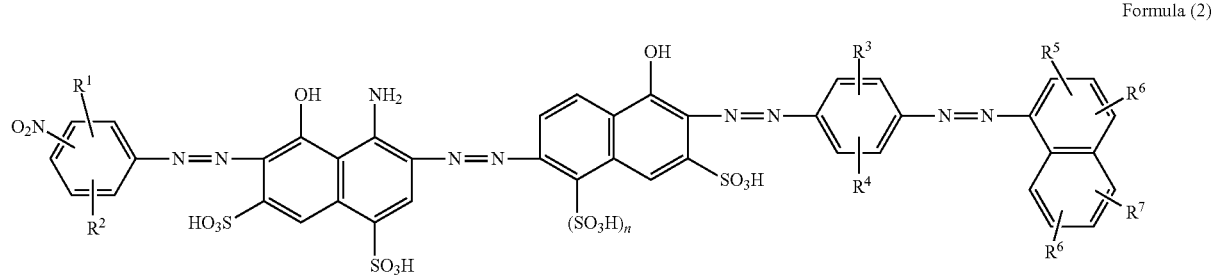

Formula (2)

wherein R¹ and R² each independently represents a hydrogen, a halogen, a cyano group, a carboxy group, a sulfo group, a sulfamoyl group, a N-alkylaminosulfonyl group, or a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, or a N-phenylaminosulfonyl group; and n is 0 or 1.

10. The ink-jet ink set of claim 7, wherein the yellow dye is selected from the group consisting of 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl); 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9Cl); Benzenesulfonic acid, 2,5-dichloro-4-[4,5-dihydro-3-methyl-5-oxo-4-[(4-sulfophenyl)azo]-1H-pyrazol-1-yl]-, disodium salt (9Cl); 1H-Pyrazole-3-carboxylic acid, 4,5-dihydro-5-oxo-1-(4-sulfophenyl)-4-[(4-sulfophenyl)azo], trisodium salt (9Cl); 1,5-Naphthalenedisulfonic acid, 3,3'-[[6-[(2-hydroxyethyl)amino]-1,3,5-triazine-2,4-diyl]bis[imino(2-methyl-4,1-phenylene)-2,1-diazenediyl]]bis-, sodium salt (1:4) or TMA salt; and combinations thereof.

11. The ink-jet ink set of claim 7, wherein the magenta dye is selected from the group consisting of 6-Benzothiazolesulfonic acid, 2-[4-cyano-3-(1,1-dimethylethyl)-5-[[4-methyl-6-[(6-sulfo-2benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl]; 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3); 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9Cl); Xanthylium, 3-[(2,6-dimethylphenyl)amino]-6-[(2,6-dimethylsulfophenyl)amino]-9-(2-sulfophenyl)-, inner salt, monosodium salt (9Cl); Xanthylium, 3,6-bis(diethylamino)-9-(2,4-disulfophenyl)-, inner salt, sodium salt (9Cl); 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (9Cl); Nickel, 5-[(2-hydroxy-3,7-disulfo-1-naphthalenyl)azo]-1H-1,2,4-triazole-3-carboxylate sodium complexes; and combinations thereof.

12. The ink-jet ink set of claim 7, wherein the cyan dye is Cuprate(3-), [[3,3',3"-[[23-[[3-[[(2-hydroxypropyl)amino]

sulfonyl]propyl]sulfonyl]-29H,31H-phthalocyanine-2,9,16-triyl-κN29,κN30,κN31,κN32]tris(sulfonyl)]tris[1-propane-sulfonato]](5-)]-, trilithium, (SP-4-2)-(9Cl).

13. The ink-jet ink set of claim 7, wherein the plurality of color inks are selected from the group consisting of cyan ink, magenta ink, yellow ink, and combinations thereof.

14. The ink-jet ink set of claim 7, wherein the plurality of color inks are selected from the group consisting of cyan ink, magenta ink, yellow ink, light cyan ink, light magenta ink, and combinations thereof.

15. The ink-jet ink set of claim 7, wherein the plurality of color inks are selected from the group consisting of cyan ink, magenta ink, yellow ink, light cyan ink, light magenta ink, light gray ink, medium gray ink, and combinations thereof.

16. A method of making a dye-based black ink formulation, comprising:
providing at least one dye from each of the following: a black dye, a yellow dye, a magenta dye, and a cyan dye;
mixing the dyes; and
forming the dye-based black ink formulation, wherein the black dye is in an amount from about 0.5 to 5.0 weight percent of the dye-based black ink formulation, wherein the yellow dye is in an amount from about 0.5 to 4.0 weight percent of the dye-based black ink formulation, wherein the magenta dye is in an amount from about 0.2 to 3.5 weight percent of the dye-based black ink formulation, and wherein the cyan dye is in an amount from about 0.5 to 4.0 weight percent of the dye-based black ink formulation, wherein the black dye is selected from the group consisting of 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt; 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy)phenyl]azo]-4,5-dihydroxy-, potassium sodium salt; Cuprate(4-), [2-(amino-κN)ethanol][7-[[3-(hydroxy-κO)-4-[[1-(hydroxy-κO)-3-sulfo-7-[(2-sulfoethyl)amino]-2-naphthalenyl]azo-κN1]phenyl]azo]-1,3-naphthalenedisulfonato(6-)]-, tetrasodium (9Cl ); 2,7-Naphthalenedisulfonic acid, 6-amino-4-hydroxy-3-[[7-sulfo-4-[(4-sulfophenyl)azo]-1-naphthalenyl]azo]-, tetrasodium salt (7Cl); 1,3-Benzenedicarboxylic acid, 5-[[4-[(7-amino-1-hydroxy-3-sulfo-2-naphthalenyl)azo]-6-sulfo-1-naphthalenyl]azo]-, tetraammonium salt (9Cl); and combinations thereof; and compounds defined by formula 1 or formula 2:

Formula (1)

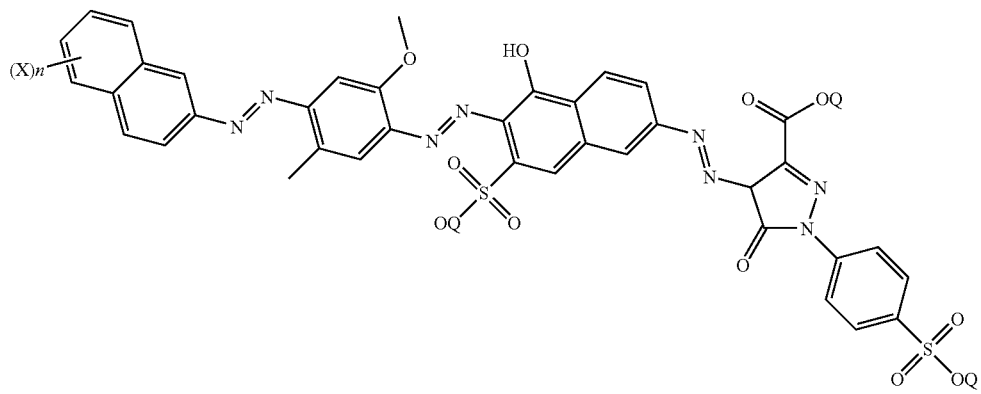

wherein X is SO₃Q, where Q is a sodium ion, lithium ion, or a combination thereof, and where n is 1, 2 or 3, Formula (2)

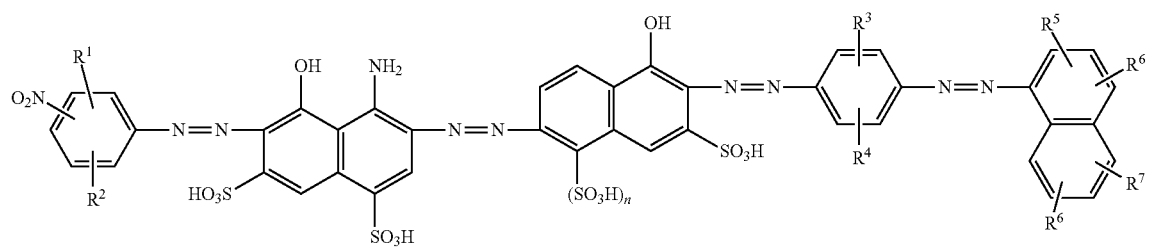

wherein $R^1$ and $R^2$ each independently represents a hydrogen, a halogen, a cyano group, a carboxy group, a sulfo group, a sulfamoyl group, a N-alkylaminosulfonyl group, or a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, or a N-phenylaminosulfonyl group; and n is 0 or 1.

17. The method of claim 16, wherein the black dye is a compound defined by formula 1 below:

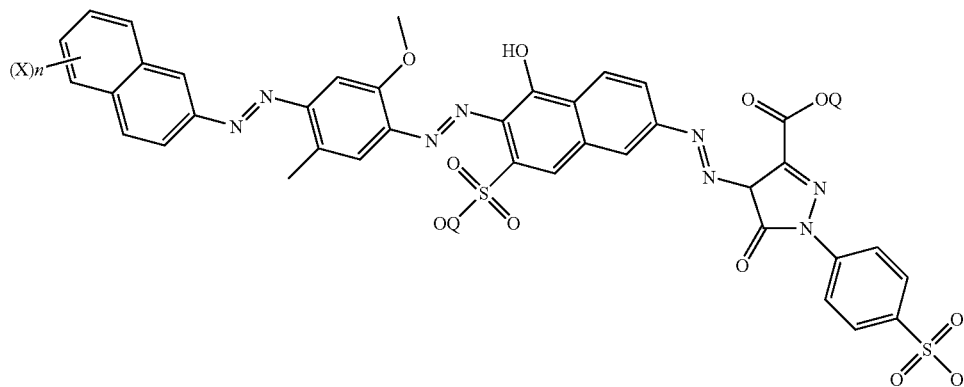

Formula (1)

wherein X is SO$_3$Q, where Q is a sodium ion, lithium ion, or a combination thereof, and where n is 1, 2 or 3.

18. The method of claim 16, wherein the black dye is a compound defined by formula 2 below:

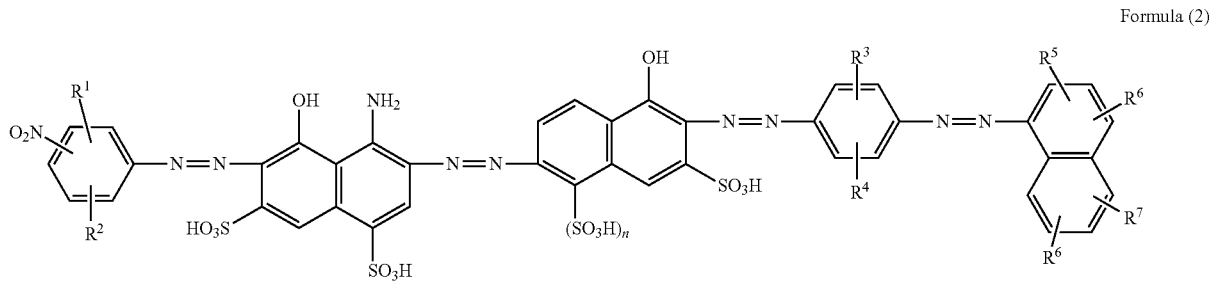

Formula (2)

wherein R$^1$ and R$^2$ each independently represents a hydrogen, a halogen, a cyano group, a carboxy group, a sulfo group, a sulfamoyl group, a N-alkylaminosulfonyl group, or a N-phenylaminosulfonyl group; R$^3$, R$^4$, R$^5$, R$^6$, R$^7$, and R$^8$ each independently represents a hydrogen, a halogen group, a hydroxy group, a cyano group, a carboxy group, a sulfo group, a sulfamoyl group, a N-alkylaminosulfonyl group, or a N-phenylaminosulfonyl group; and n is 0 or 1.

19. The method of claim 16, wherein the yellow dye is selected from the group consisting of 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl); 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9Cl); Benzenesulfonic acid, 2,5-dichloro-4-[4,5-dihydro-3-methyl-5-oxo-4-[(4-sulfophenyl)azo]-1H-pyrazol-1-yl]-, disodium salt (9Cl); 1H-Pyrazole-3-carboxylic acid, 4,5-dihydro-5-oxo-1-(4-sulfophenyl)-4-[(4-sulfophenyl)azo], trisodium salt (9Cl); 1,5-Naphthalenedisulfonic acid, 3,3'-[[6-[hydroxyethyl)amino]-1,3,5-triazine-2,4-diyl]bis[imino(2-methyl-4,1-phenylene)-2,1-diazenediyl]]bis-, sodium salt (1:4) or TMA salt; and combinations thereof.

20. The method of claim 16, wherein the magenta dye is selected from the group consisting of 6-Benzothiazolesulfonic acid, 2-[4-cyano-3-(1,1-dimethylethyl)-5-[[4-methyl-6-[(6-sulfo-2 benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl]; 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3); 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9Cl); Xanthylium, 3-[(2,6-dimethylphenyl)amino]-6-[(2,6-dimethylsulfophenyl)amino]-9-(2-sulfophenyl)-, inner salt, monosodium salt (9Cl); Xanthylium, 3,6-bis(diethylamino)-9-(2,4-disulfophenyl)-, inner salt, sodium salt (9Cl); 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (9Cl); Nickel, 5-[(2-hydroxy-3,7-disulfo-1-naphthalenyl)azo]-1H-1,2,4-triazole-3-carboxylate sodium complexes; and combinations thereof.

21. The method of claim 16, wherein the cyan dye is Cuprate(3-), [[3,3',3"-[[23-[[(2-hydroxypropyl)amino]sulfonyl]propyl]sulfonyl]-29H,31H-phthalocyanine-2,9,16-triyl-κN29,κN30,κN31,κN32]tris(sulfonyl)]tris[1-propanesulfonato]](5-)]-, trilithium, (SP-4-2)-(9Cl).

* * * * *

UNITED STATES PATENT AND TRADEMARK OFFICE
CERTIFICATE OF CORRECTION

PATENT NO. : 7,887,627 B2  Page 1 of 4
APPLICATION NO. : 11/788903
DATED : February 15, 2011
INVENTOR(S) : Sukanya Rengaswamy et al.

It is certified that error appears in the above-identified patent and that said Letters Patent is hereby corrected as shown below:

In columns 5-6, lines 1-14(Approx.), delete

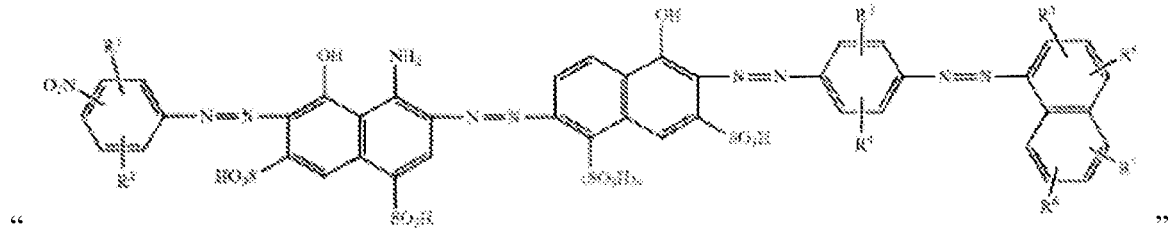

" "

and insert

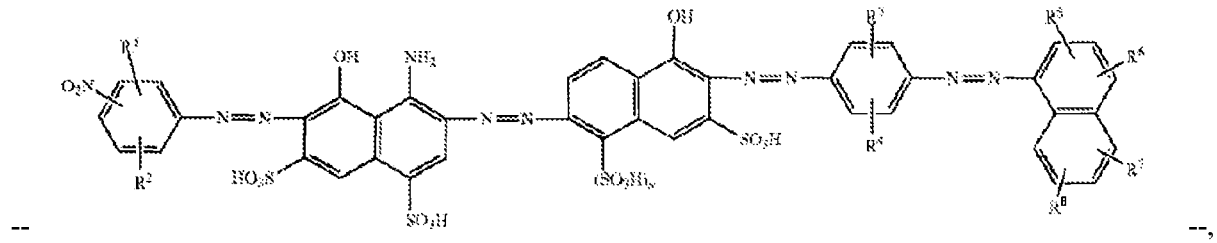

-- --, thereof.

In column 14, lines 20-54(Approx.), in Claim 1, delete

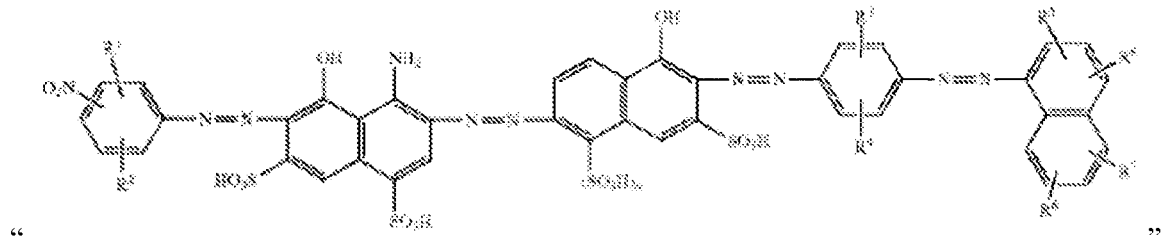

" "

and insert

Signed and Sealed this
Thirteenth Day of December, 2011

David J. Kappos
*Director of the United States Patent and Trademark Office*

CERTIFICATE OF CORRECTION (continued)
U.S. Pat. No. 7,887,627 B2

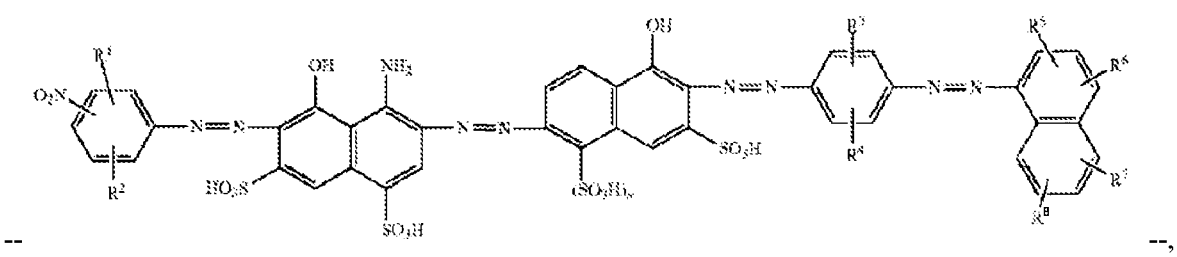

-- therefor.

In columns 15-16, lines 25-39(Approx.), in Claim 3, delete

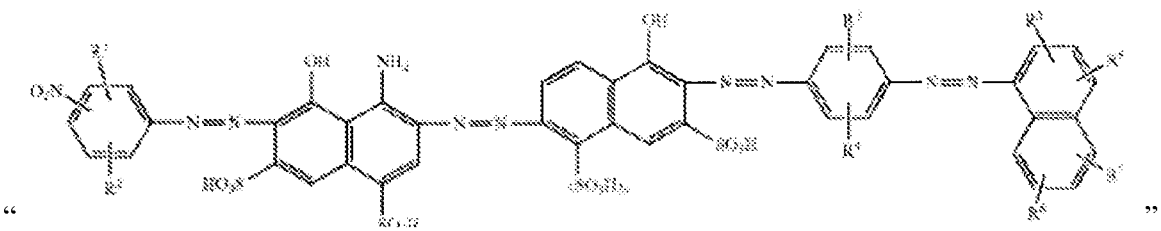

" "

and insert

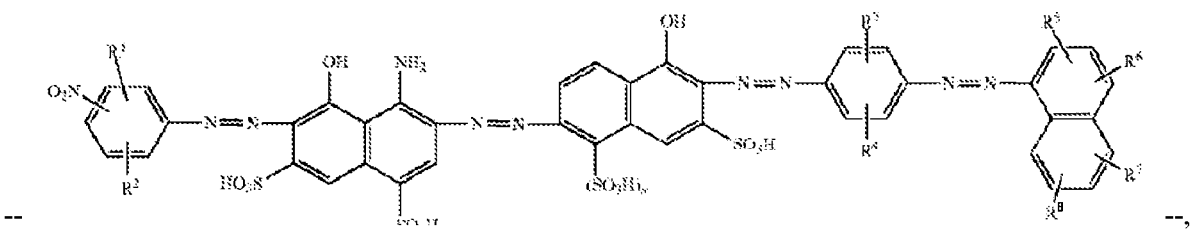

--                                                                                          --, therefor.

In column 17, line 1, in Claim 7, delete "set," and insert -- set --, therefor.

In column 17, line 3, in Claim 7, delete "dye" and insert -- a dye --, therefor.

In column 17, line 3, in Claim 7, delete "formulation," and insert -- formulation --, therefor.

In column 17, line 4, in Claim 7, delete "form" and insert -- from --, therefor.

In columns 17-18, lines 55-67(Approx.), in Claim 7, delete

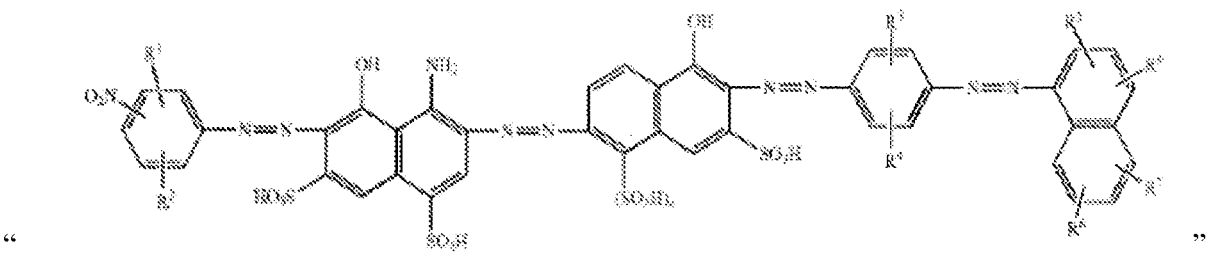

" "

and insert

CERTIFICATE OF CORRECTION (continued)
U.S. Pat. No. 7,887,627 B2

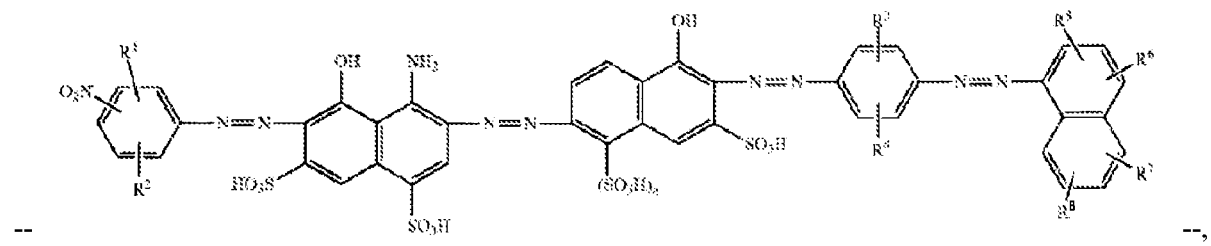

-- therefor.

In columns 19-20, lines 40-50(Approx.), in Claim 9, delete

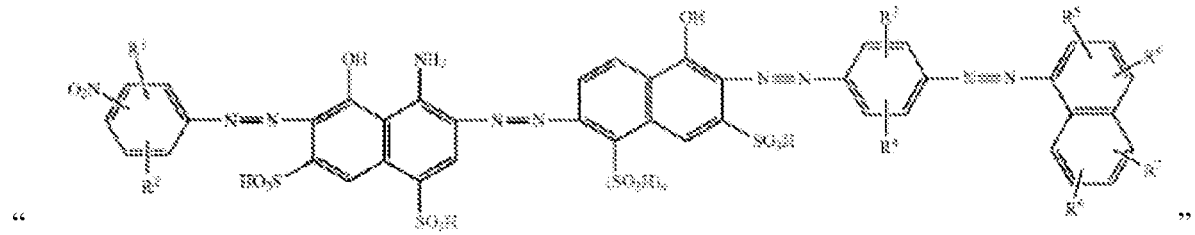

" "

and insert

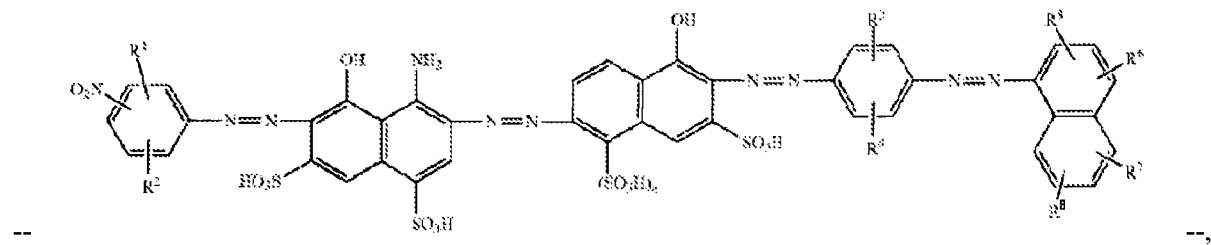

-- therefor.

In columns 21-22, lines 43-57(Approx.), in Claim 16, delete

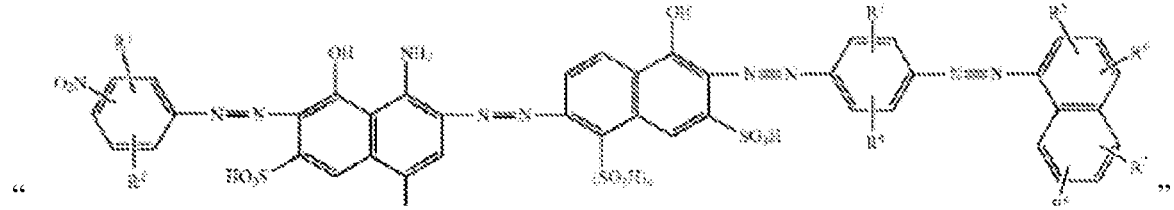

" "

and insert

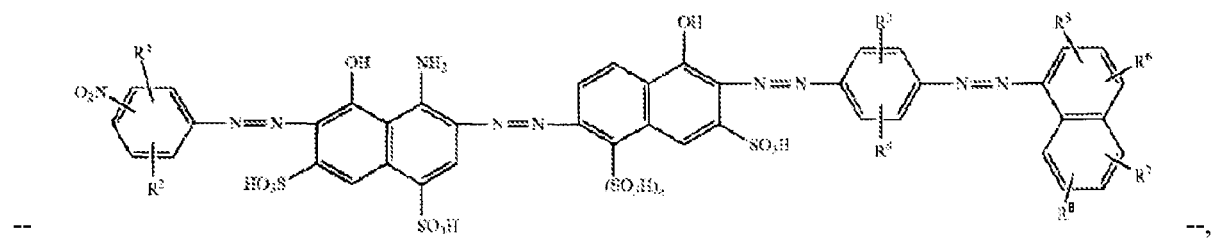

-- therefor.

In columns 23-24, lines 27-42(Approx.), in Claim 18, delete

CERTIFICATE OF CORRECTION (continued)
U.S. Pat. No. 7,887,627 B2

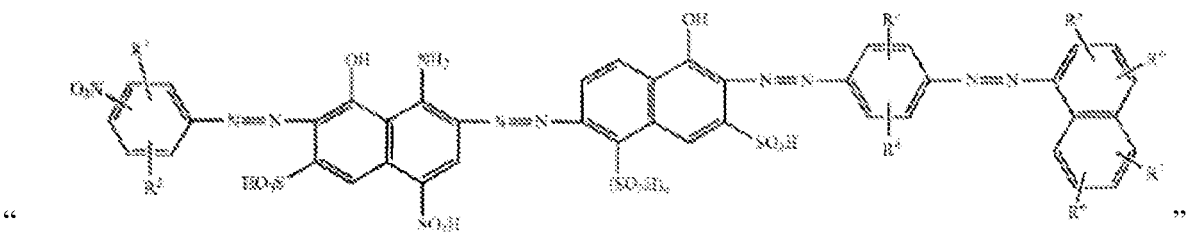

" and insert

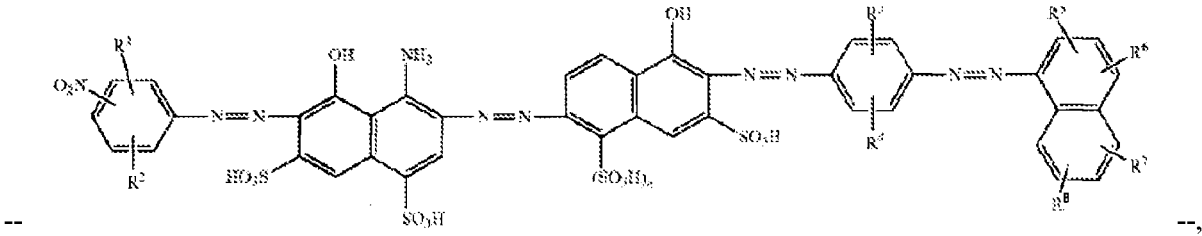

-- therefor.

In column 23, line 64, in Claim 19, delete "[[6-[hydroxyethyl)" and insert -- [[6-[(2-hydroxyethyl) --, therefor.